United States Patent Office 3,342,163
Patented Sept. 19, 1967

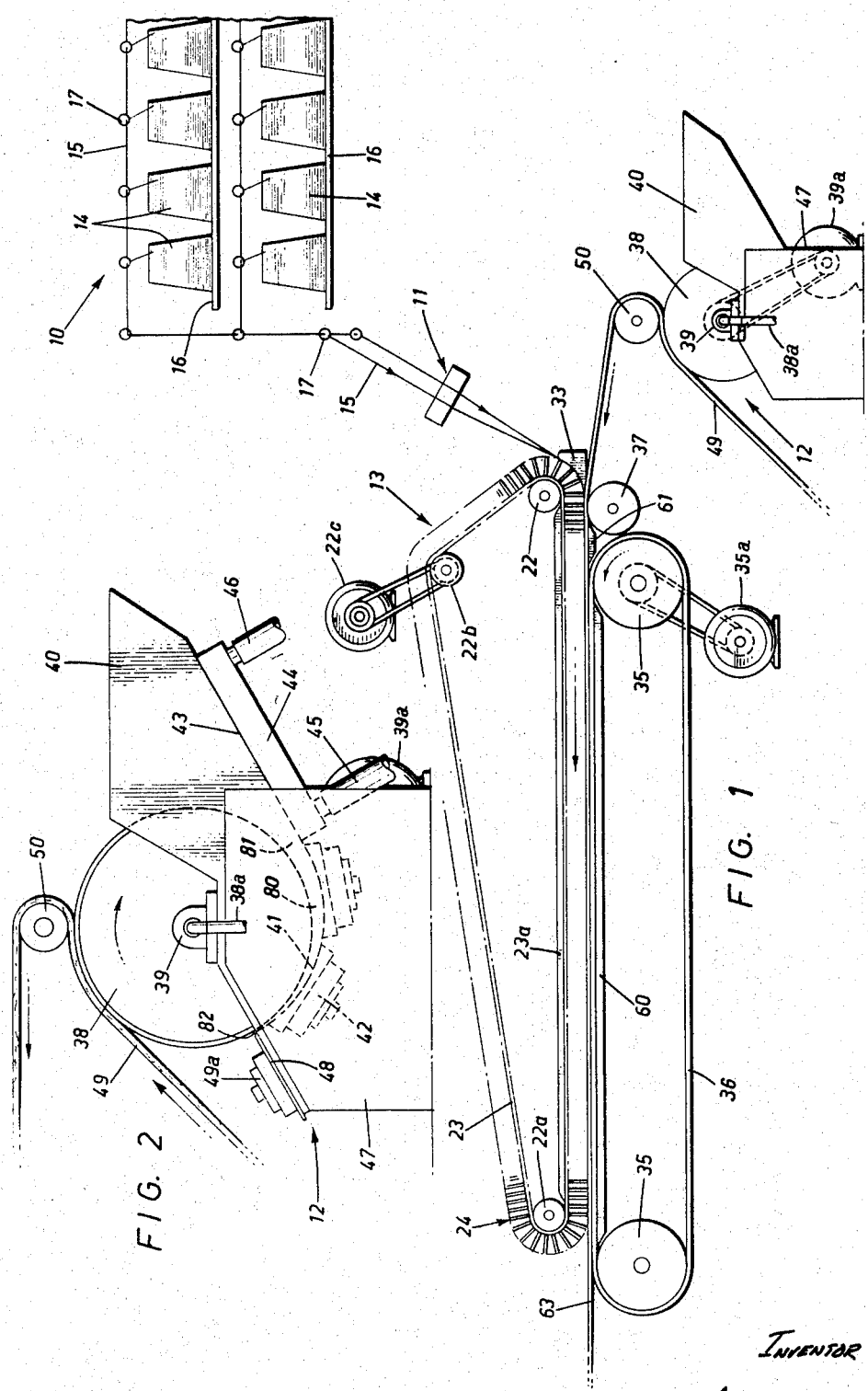

3,342,163
APPARATUS FOR COATING A MATERIAL WITH A MOLTEN THERMOPLASTIC MATERIAL
William D. McAlpine, 44 Cumbrian Court, Brampton, Ontario, Canada
Filed May 3, 1965, Ser. No. 452,661
Claims priority, application Great Britain, May 5, 1964, 18,704/64
5 Claims. (Cl. 118—202)

ABSTRACT OF THE DISCLOSURE

A rotatable roller cooperates with a plate that is spaced apart from the cylindrical surface of the roller but positioned progressively closer to the curved roller surface to define a chamber of progressively decreasing depth from an inlet end to an outlet end thereof. A hopper supplies thermoplastic material that is cooled in the hopper to a temperature below the melting point of the thermoplastic material to the inlet end of the chamber, while the thermoplastic material is heated above its melting point in the chamber. A second cooled roller is spaced apart from the first roller and rotates about an axis parallel to the axis of rotation of the first roller. An endless heat conductive belt extends between the rollers, and picks up molten thermoplastic material as the belt rotates through the chamber. Material to be coated with the molten thermoplastic is brought into contact with the belt after it leaves the chamber and is maintained in contact with the belt until the material has passed at least part way around the second roller.

---

This invention relates to the art of carpet manufacturing. More particularly, this invention relates to methods and apparatus for use in making carpets of the loop-pile type.

Prior art types of carpet making machines have operated either on the principle of a reciprocating member which drives yarns or a batt of material between a series of blades, thereby forming loops between the blades, or on the principle of passing yarns or a batt of material between intermeshing fluted rollers, drums or shuttle cams to form loops. In contrast, in accordance with one aspect of this invention, loops of yarn or of a batt of material are formed between adjacent blades during movement of the blades towards each other.

In the manufacture of a carpet it is necessary to attach the pile of the carpet to a backing. One way that this has been done in the past is by applying polyethylene powder to the backing, heating the powder to melt the same, and then bonding the pile to the so treated surface of the backing. This method is quite costly, however. As those skilled in the art will appreciate, it is not possible to obtain satisfactory results by merely heating polyethylene pellets in a container with the hope of producing molten polyethylene which then could be applied to a surface of the backing. When the pellets are so heated, the outer surfaces of the pellets turn brown and flaky before the cores of the pellets can melt.

In accordance with another aspect of this invention, there is provided apparatus for coating a backing or other material with a molten thermoplastic material.

Figure 4:
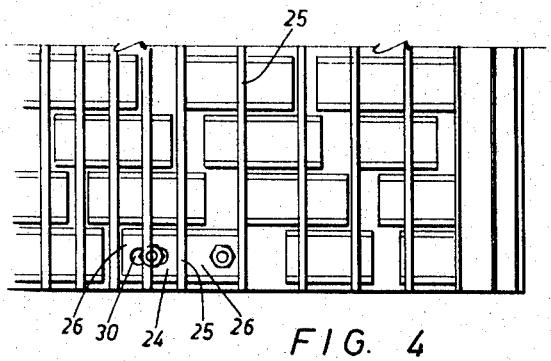
Figure 5:
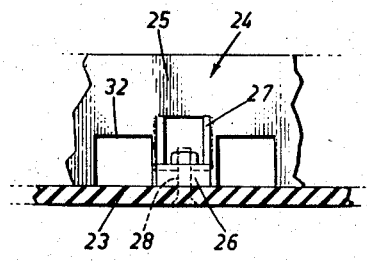
Figure 3:
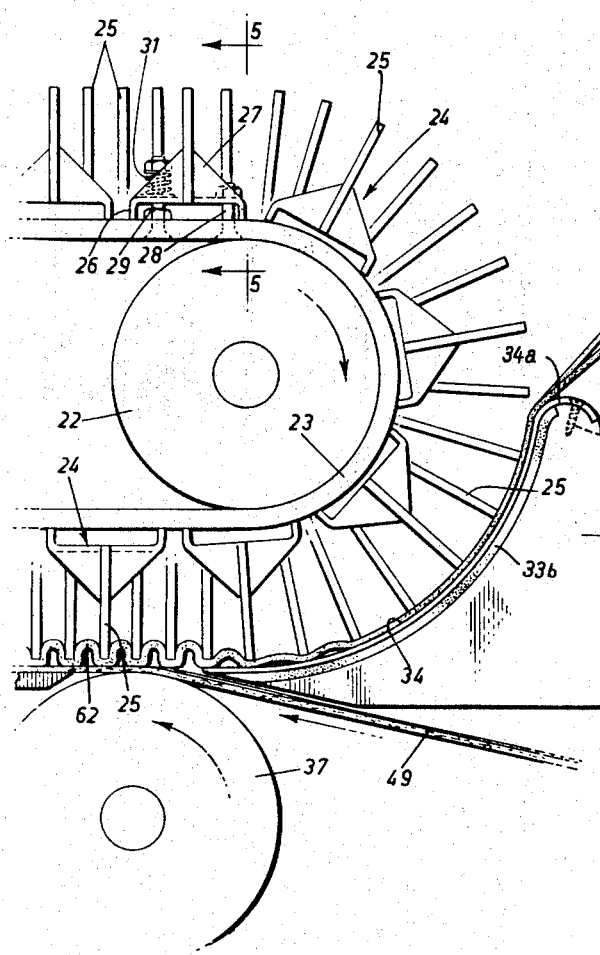
Figure 6:
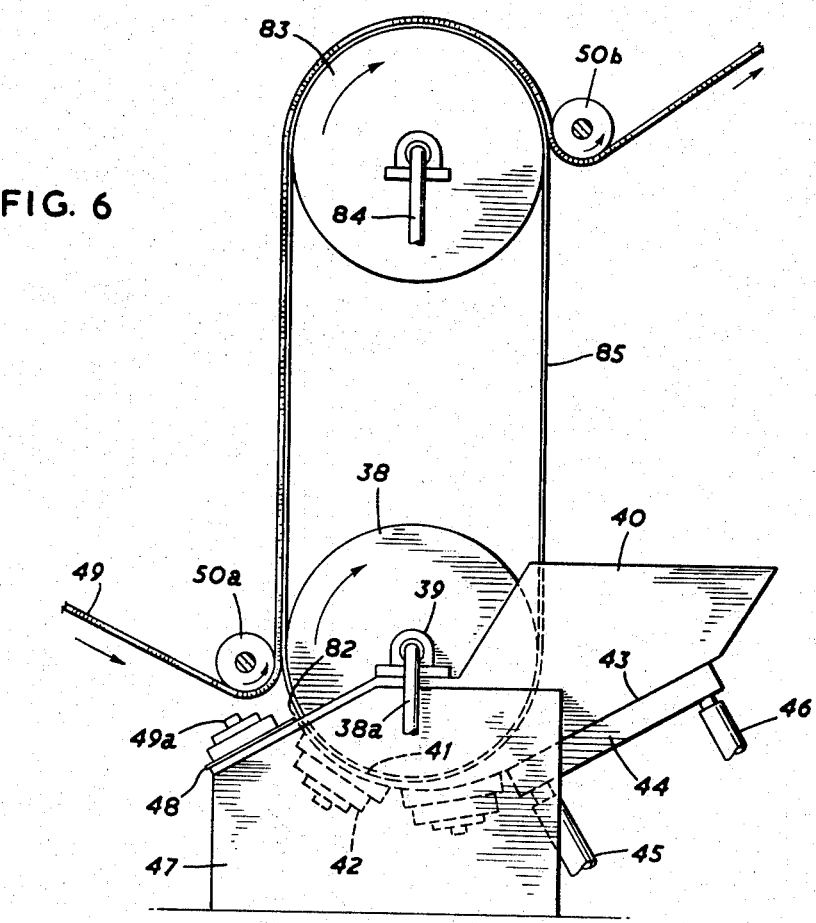

The nature of this invention will become apparent from the following detailed disclosure, taken in conjunction with the appended drawings, in which:

FIGURE 1 is a schematic side elevation of carpet manufacturing apparatus embodying this invention, FIGURE 2 is a side elevation in greater detail of the adhesive applying equipment of FIGURE 1, FIGURE 3 is a side elevation in greater detail of the loop forming equipment illustrated in FIGURE 1, FIGURE 4 is a top elevation of a part of the apparatus of FIGURE 3, FIGURE 5 is a section taken along line 5—5 in FIGURE 3, and FIGURE 6 is a side elevation of another type of adhesive applying equipment embodying this invention.

Referring to the drawings, particularly FIGURE 1, there is shown a spool station 10, a height-of-loop regulating device 11, a machine 12 for applying an adhesive material to what subsequently becomes the backing of a carpet, and which, per se, embodies inventive features that are claimed herein and a machine 13 for integrating the carpet backing and pile and forming the pile into loops, and which, per se, embodies inventive features that are claimed in co-pending application Serial No. 452,632.

At spool station 10 a plurality of spools 14 of pile forming yarns 15 are mounted on conventional racks 16, it being understood that each spool 14 in FIGURE 1 is the end spool of a row of similar spools. The yarns 15 from each spool 14 are led through yarn guides 17 of a conventional type to height-of-loop regulating device 11.

Device 11 is in the form of an elongated bar of the same width as machine 13 and has a plurality of openings 18 therein through which yarns 15 pass, as best shown in FIGURE 3. For each opening 18 a solenoid 19 is provided. Each solenoid 19 is adapted to actuate a pin 20 which is slidable in an opening 21 in device 11. The ends of pins 20 may be moved by solenoids 19 into openings 18 to restrict movement of yarns 15 through device 11 by varying the tension in yarns 15 in order that the pile loop height of the subsequently formed pile may be regulated, as will become more apparent hereinafter.

Machine 13 includes three rollers 22, 22a and 22b, roller 22b of which is driven by a motor 22c (shown schematically) and the others of which are free to rotate. An endless, flexible belt 23 extends around rollers 22, 22a and 22b and is driven by driven roller 22b. Belt 23 may be fabricated from rubber, for example. A part of belt 23 runs against a back bed 23a.

Mounted on and projecting from belt 23 are dogs 24, each of which has a loop former blade or finger 25 in the form of an elongated bar which extends the width of belt 23. Each dog 24 includes two, spaced-apart generally U-shaped foot members 26 which have upright braces 27 formed integral therewith, the latter being fixed to blades 25 by welding, for example. Foot members 26 and hence dogs 24 are mounted on belt 23 by nut and bolt assemblies 28 and 29. As best shown in FIGURE 4, the bolts of assemblies 29 each pass through elongated openings 30 in foot members 26, and springs 31 are provided between these bolts and their associated nuts. Springs 31 bias foot members 26 against belt 23, and the arrangement is such that foot members 26 are kept in continuous contact with belt 23 while belt 23 passes over roller 22, as best shown in FIGURE 3.

It will be seen from FIGURE 3 that adjacent blades 25 are spaced close to each other. This close spacing is effected by the provision of openings 32 (FIGURE 5) in each blade 25 into which the foot members 26 of adjacent dogs 24 are passed.

Machine 13 also includes a loop former back bed 33 which extends the width of the machine and which has a loop-forming surface 34 curved to conform with the locus described by the ends of blades 25 as they pass over roller 22. Loop former back bed 33 preferably is adjustable vertically and horizontally so that the gap between its surface 34 and the ends of blades 25 can be adjusted to accommodate yarns 15 of varying thickness.

Preferably surface 34 is the surface of a plate 34a of steel, rigid plastic, or the like secured to the rear portion of member 33 by screws 33a, or the like, and beneath which is a pad 33b of resilient material such as rubber. Pad 33b supports plate 34a in a resilient manner to ensure proper gripping of yarns 15 by fingers 25 in the loop forming operation to be described hereinafter.

Finally, machine 13 includes two rollers 35, one of which is driven by a motor 35a (shown schematically) and the other of which rotates freely, a conveyor belt 36 extending around rollers 35, driven by the driven roller and of the same width as machine 13, and an idler roller 37 which is free to rotate. Belts 23 and 36 are driven to travel at the same linear speed. Positioned beneath conveyor belt 36 and forming a support for the top part thereof between rollers 35 is a support table 60 which extends the width of conveyor belt 36.

Turning now to machine 12, this machine includes a hollow, cylindrical roller 38 of steel or the like journalled in bearings 39 and driven by a motor 39a (shown schematically) to rotate, in the direction shown in FIGURE 2 by the arrow, in the front part of a hopper 40. Roller 38 may be heated, if necessary or desirable, by gas or steam introduced via a line 38a axially into roller 38 through known types of couplings (not shown). Roller 38 also could be electrically heated.

As best shown in FIGURE 2, hopper 40 is designed so that the front, curved plate 41 of its bottom wall moves progressively closer to the curved surface of roller 38 in the direction of rotation of the latter, and the end 42 of plate 41 of the hopper almost touches the curved surface of roller 38. It will be seen that plate 41 and a part of the cylindrical surface of roller 38 define a chamber 80 of progressively decreasing depth from an inlet end 81 to an outlet end 82 thereof. Plate 41 is heated by electric heating units 42, although other heating devices may be employed if desired. The rear section 43 of the bottom wall of the hopper is cooled by a cooling jacket 44 having inlet and outlet connections 45 and 46 for coolant liquid.

Reference numeral 47 designates the supporting frame for hopper 40 and roller 38. Preferably roller 38 and hopper 40 are supported in such a manner that the position of the hopper relative to the roller can be adjusted readily.

Supported by frame 47 adjacent outlet 82 is a doctor blade 48 which may be heated by an electrical heater 49a, for example, and which is adjustable towards and away from the roller 38.

Any suitable backing material 49 such as burlap felt or other fabric is unwound from a reel (not shown) and passes over roller 38, around an idler roller 50, over idler roller 37 and finally is picked up and carried by conveyor belt 36. Between idler roller 37 and conveyor belt 36 the backing material 49 is supported by a short support table 61 which extends the width of backing material 49.

Machine 12 serves the function of applying an adhesive to one surface of backing material 49. This is achieved by supplying granules, flakes, chips or a powder of a thermoplastic material such as polyethylene to hopper 40. The surface of roller 38 and plate 41 is heated to a temperature above the melting point of the thermoplastic material so that the particles of thermoplastic material becomes molten in chamber 80. As the pellets or the like supplied from hopper 40 pass from inlet 81 of chamber 80 through chamber 80, they are subjected to a progressively increasing pressure due to the decreasing depth of chamber 80. This pressure tends to flatten the pellets out thus insuring that they melt all the way through. Roller 38 rotates in the molten thermoplastic material and picks up the sticky molten plastic on the surface of the roller. The amount of plastic film which is permitted to remain on the surface of roller 38 is regulated by doctor blade 48. Backing material 49 is brought into contact with surface of roller 38, picks up thermoplastic material and then passes over idler roller 50, which presses material 49 against roller 38, and is conveyed to machine 13.

Particles of thermoplastic material in the portion of hopper 40 adjacent to cooling jacket 44 restrict the supply of air to the molten plastic material beneath roller 38 to minimize oxidation thereof and also act as a reservoir for thermoplastic coating material. It is important that the thermoplastic material in hopper 40 be kept at a temperature below the melting point of the thermoplastic material, otherwise decidedly unsatisfactory results will be obtained because of oxidation. This function is performed by cooling jacket 44.

The speed of roller 38 may be adjusted for optimum results. One important feature of coating machine 12 is that it can operate using scrap pieces of thermoplastic material.

An alternative embodiment of coating machine 12 is shown in FIGURE 6. In this case there is provided an idler roller 83 spaced from and journalled for rotation about an axis parallel to the axis of rotation of roller 38. Roller 83 is hollow and is cooled by water or air, for example, introduced axially therein via a line 84 and a suitable coupling (not shown). Extending between rollers 38 and 83 and driving the latter is an endless belt 85 made of a flexible, heat conductive material, e.g. thin steel.

The molten thermoplastic material in chamber 80 is picked up by belt 85 which, by means of idler rollers 50a and 50b, is brought into contact with a surface of backing 49, the contact being maintained until belt 85 has passed at least part way around roller 83. Because of the chilling effect of roller 83, this equipment will result in most of the film of molten thermoplastic material carried by belt 85 being transferred to backing 49. Care should be taken to ensure that roller 83 is not so cold as to "freeze" the thermoplastic material, however.

Referring now to FIGURES 1 and 3 for a description of the operation of machine 13, it will be seen that yarns 15 are positioned between the surface 34 of loop former back bed 33 and blades 25 of dogs 24, the ends of blades 25 gripping yarns 15. The blades 25 of those dogs 24 which are on the straight parts of conveyor belt 23 between rollers 22 and 22a are parallel and equally spaced apart from each other. However, as best seen in FIGURE 3, when conveyor belt 23 begins to curve around roller 22, the ends of blades 25 automatically spread apart from each other, and when the ends of these blades first engage yarns 15, they are spread apart from each other a maximum amount. As dogs 24 begin to leave roller 22, the ends of blades 25 automatically come together again. In essence, roller 22 defines a path for belt 23 having a radius of curvature about the same as the radius of curvature of roller 22. When belt 23 comes off roller 22, however, it moves in a path having a much greater radius of curvature, in the present case virtually an infinite radius of curvature, since the bottom portion of belt 23 is tangential to roller 22. The movement of the belt from a portion of a path having a certain radius of curvature to another portion of the path having a greater radius of curvature causes the ends of blades 25 to move towards each other automatically. During the automatic movement of blades 25 towards each other, and because of this action and the confining action of loop former back bed 33, the yarns 15 are formed into loops 62 between blades 25, as best shown in FIGURE 3.

The height of loops 62 may be varied by changing the diameter of roller 22 or by varying the height of blades 25. The numbers of rows of loops per inch may be varied by altering the spacing between dogs 24.

As best shown in FIGURE 3, after loops 62 have been formed, they are pressed into the surface of backing material 49 carrying the film of thermoplastic material and thereby are bonded to backing material 49. The spacing between rollers 22 and 22a is sufficient to ensure that the pile is bonded to backing material 49 by the time that the now completed carpet leaves machine 13 at point 63. It will be seen from FIGURE 1 that during the bonding operation pressure is maintained upon the parts of yarns 15 between the loops 62 by virtue of the fact that these parts and backing material 49 are sandwiched between the ends of blades 25 and conveyor belt 36 and its associated support table 60.

Device 11 is used in the event that it is desired to form a carpet with a pattern of alternatively high and low loops 62. As each loop 62 begins to form in the yarn solenoids 19, whose operation is synchronized to the movement of dogs 24, and which may be controlled by electrical impulses from a punched card type of programmer, are energized. The solenoids momentarily force pins 20 against yarns 15 to tension the yarns and restrict the movement of yarns 15 through openings 18. This forces blades 25 engaging yarns 15 to slide over a portion of the yarns, thus creating a shorter loop. The extent to which the height of loops 62 are lessened by the action of device 11 is determined by the length of time that solenoids 19 are energized to hold pins 20 against yarns 15. When the solenoids are de-energized, pins 20 are returned to their normal position by means of return springs (not shown) and loops 62 of regular height then will be formed. Other means and methods for forming a pile of high-low pattern may be employed, of course.

It should be appreciated that rather than feeding yarns 15 to machine 13, a fibre web or bat may be supplied in place of yarns 15 to produce certain types of carpeting or cushioning material. The web or bat may be produced by a machine such as a garnetting machine, for example. Under such circumstances a loop height control device 11 generally would not be employed.

It should be noted that support table 60 and support table 61 preferably are perforated and means (not shown) preferably are supplied for blowing cool air through these support tables to cool the molten thermoplastic material and render it solid by the time that the carpet reaches point 63 in machine 13.

Those skilled in the art will appreciate as well that conveyor belt 23 and its dogs 24 may be formed in many different ways, the essential thing being that the blades of dogs 24 come together as the dogs move from a path having a certain radius of curvature to a path having a greater radius of curvature. Thus, conveyor belt 23 may be of a type similar to a bicycle chain with dogs 24 carried on the various links thereof. Alternatively, conveyor belt 23 and dogs 24 may be formed integral with each other by cutting the belt and dogs directly from a block of appropriate length and width and formed from a material such as hard rubber or "nylon" (trademark).

While preferred embodiments of this invention have been disclosed, those skilled in the art will appreciate that changes and modifications may be made therein without departing from the spirit and scope of this invention as defined in the appended claims.

What I claim as my invention is:

1. Apparatus for coating a material with molten thermoplastic material which comprises: a roller journalled for rotation and having a cylindrical surface; means for rotating said roller; a plate spaced apart from said cylindrical surface of said roller but positioned progressively closer to said curved surface in the direction of rotation of said roller, whereby a part of said cylindrical surface and said plate define a chamber of progressively decreasing depth from an inlet end to an outlet end thereof; a hopper for supplying thermoplastic material to said inlet end of said chamber; means for cooling said thermoplastic material in said hopper to a temperature below the melting point of said thermoplastic material; means for heating said thermoplastic material in said chamber to a temperature above the melting point of said thermoplastic material a second roller spaced-apart from and journalled for rotation about an axis parallel to the axis of rotation of the first-mentioned roller; means for cooling said second roller; an endless heat conductive belt extending between said rollers and adapted to pick up molten thermoplastic material as said belt rotates through said chamber; and means for bringing said material into contact with said belt after said belt has rotated through said chamber and picked up molten thermosplastic material and for maintaining the contact between said belt and said material until said material has passed at least part way around said second roller.

2. Apparatus according to claim 1 wherein said means for heating said thermoplastic material includes means for heating said cylindrical surface of said roller and means for heating said plate.

3. Apparatus according to claim 1 wherein said plate is formed integral with said hopper.

4. Apparatus according to claim 1 including a doctor blade positioned adjacent said outlet end of said chamber.

5. Apparatus according to claim 1 wherein said plate is a curved plate.

References Cited
UNITED STATES PATENTS

| | | | |
|---|---|---|---|
| 2,783,735 | 3/1957 | Paulsen | 118—410 |
| 2,962,406 | 11/1960 | Rosa | 156—311 |
| 3,239,367 | 3/1966 | Demeter | 118—216 |

FOREIGN PATENTS

| | | |
|---|---|---|
| 560,388 | 4/1957 | Italy. |

CHARLES A. WILLMUTH, *Primary Examiner.*

R. I. SMITH, *Assistant Examiner.*